Patented Apr. 1, 1947

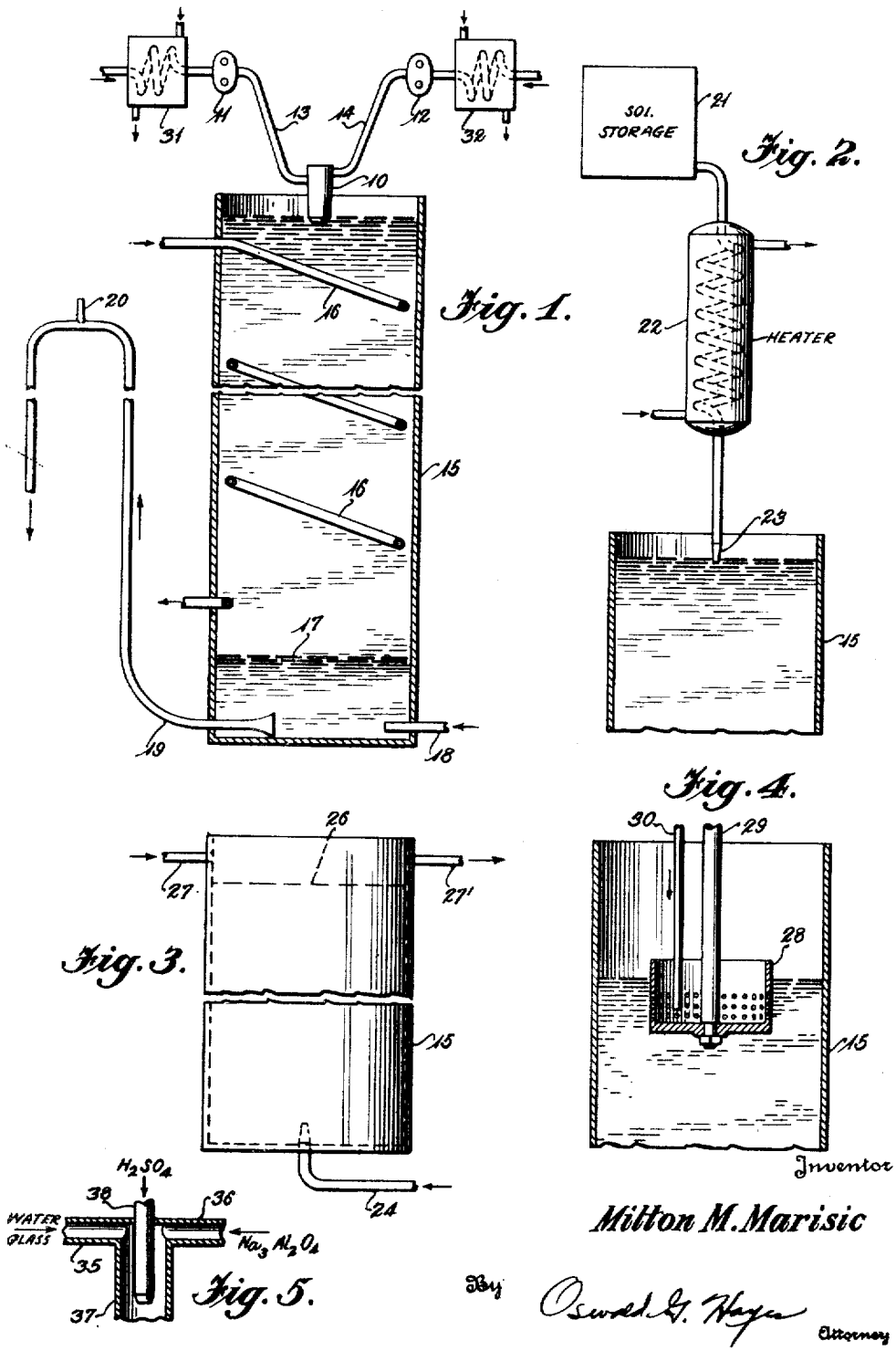

2,418,232

UNITED STATES PATENT OFFICE 2,418,232

PROCESS OF PREPARING AN INORGANIC OXIDE GEL

Milton M. Marisic, Woodbury, N. J., assignor to Socony-Vacuum Oil Company, Incorporated, a corporation of New York Application May 11, 1944, Serial No. 535,102

13 Claims. (Cl. 252—317)

1

This invention relates to a process for forming smooth surfaced pellets of generally spheroidal shape composed of inorganic oxides having a gel structure. Particularly, the invention is concerned with a process of that type wherein a hydrogel globule is formed from a sol of relatively long gelation time at the temperature of formation of the sol. As a preferred embodiment, the present invention is particularly concerned with a process characterized by formation of the sol at a temperature of about 35° to about 50° F. This application is a continuation-in-part of my copending application Serial No. 491,545, filed June 19, 1943.

In certain prior copending applications, I have described processes wherein a sol having a definite gelation time is formed and thereafter extruded into a column of a liquid which is immiscible with the sol, for example, mineral oil, of sufficient depth that the sol extruded therein gels during its passage therethrough. While the sol is still in the liquid state it assumes a globular form which is retained upon gelatin. The globules of hydrogen may then be removed, washed and dried to yield hard spheroidal pellets of inorganic gel which are very useful for many purposes known to the arts for use of dried inorganic gels, for example in the conversion of hydrocarbon oils.

It is known that many operations for the conversion of hydrocarbon materials to other hydrocarbon materials of differing physical and/or chemical properties may be carried out catalytically. Most of these are carried out by contacting the hydrocarbon, usually in vapor form and at high temperature, with a contact mass composed of particles which themselves have a catalytic effect, or which are impregnated with or act as a support for other catalytic material of a nature appropriate to the result desired. Such operations may contemplate, for example, the conversion of hydrocarbons of high boiling point to those of lower boiling point, or the polymerization of light or gaseous hydrocarbons to hydrocarbons of higher boiling point. Other operations of like nature are catalytic dehydrogenation, hydrogenation, polymerization, alkylation, reforming, aromatization, desulfurization, partial oxidation and similar conversions of hydrocarbon materials. The method of operation and apparatus herein disclosed are applicable to all such conversions. Of these operations, the vapor phase cracking of heavy hydrocarbons to gasoline is typical, and this specification will hereinafter discuss such operations as exemplary, without, however, intending to be limited thereby or thereto except by such limits as may appear in the claims.

Such catalytic processes generally make use of reaction chambers containing a fixed body of catalyst or contact mass, through which the reaction mixture is passed, and in which, after the reaction has slowed down to an uneconomic point, the contact mass is regenerated in situ. Such processes are not continuous, and only attain continuity by the provision of numerous reaction chambers which are alternately placed on stream and on regeneration. Likewise, it is difficult to maintain constant quantity and quality of product without numerous chambers and intricate scheduling, due to the progressive decreasing activity of the catalyst. This same feature, with apparatus limitations, prevents, to a degree, the use of a catalyst, at a uniform high efficiency level. Most of these difficulties may be avoided by the use of a method wherein the catalyst or contact mass is handled continuously as well. The catalyst of this invention is particularly well adapted to such a process, although advantages over previous catalysts are noted in stationary bed operations.

This invention has for its preferred object the provision of catalyst for a process of hydrocarbon oil conversion wherein a continuously-moving stream of hydrocarbon oil is contacted with a continuously-moving stream of catalyst for the accomplishment of conversion, in which the catalytic material is used only at a high level of efficiency and in which the catalytic material is continuously regenerated and returned to the conversion step, both operations being conducted under controlled conditions.

Other objects include provision of a gel in spheroidal form as a composition available for many purposes. In such operations, frequently the term "gel" has been rather loosely applied to include both true gels and gelatinous precipitates. In forming pellets of either, the gel or precipitate has been caused to form completely and then is subjected to suitable operation for the formation of particles. These have not been particularly satisfactory because the particles obtained are not resistant to losses by shock breakage and abrasion. The common operations include breaking a mass of gel to fragmentary particles and screening to separate particles of desired size. This results in the production of a considerable amount of fines which are a loss since they cannot be re-used in the same catalytic equipment. In some cases, the wet gel or precipitate is molded. This requires expensive molding equipment and costly cleaning of molds. It is also proposed (reissue Patent 21,690) to separate the mass into two parts, one of which is dried and crushed and the other used wet to bind the crushed portion in a molding operation which involves the usual objections to molding.

The present catalyst is prepared by a method which eliminates the heretofore necessary step of converting formed gel masses into a usable form by some type of pelleting operations. Another feature is that the gel contact masses are produced in spherical and/or spheroidal shapes. This form is ideal for any process in which a contact bed is utilized, whether it be of the stationary or the moving (or flowing) type of bed. Spherically-shaped particles can pack only in a uniform manner, hence channeling of vapors or fluids flowing through this type of bed is impossible. For an operation in which a moving (or flowing) contact bed is employed, pellets of a spherical shape afford unique flow characteristics. The present catalyst is exceptionally hard and presents novel advantages over previously known catalysts apart from the spheroidal shape of the preferred form. This hardness is retained by particles produced by crushing the spheroids.

The above-mentioned process, described in my prior applications, of forming the pellets involves continuously contacting within an enclosed mixing chamber such as an injector or nozzle mixer, streams of reactant solutions of such concentrations and proportions that no gelation occurs within the mixer, but only at some predetermined time after leaving the mixer, and under such conditions of flow that each stream is completely and uniformly dispersed within and throughout the other at the instant of contact. The resulting colloidal solution is ejected from the mixer through an orifice or orifices of suitable size so as to form globules of the solution which are introduced into a fluid medium where the globules of the colloidal solution set to a gel before they pass out of that medium. The fluid medium may be any liquid or combination of liquids which is immiscible with water such as, for example, petroleum naphtha, kerosene, hydrocarbon oils, etc.

There are two alternative methods of operation which are dependent upon the density of the fluid employed. When the density of the fluid is lower than that of water, the fluid is supported over a layer of water and the colloidal solution from the mixer is introduced at the top of the column of fluid; the height of the latter and the gelation time being adjusted so that gelation occurs within the fluid and before the globose particles reach the water surface. For a fluid more dense than water, the procedure is reversed; the colloidal solution is ejected into the bottom of the fluid, the globules rise up through the fluid, gel and pass into a layer of water which conducts the gel away for processing.

The shapes of the formed gel are dependent upon the rate at which the globules of the colloidal solution travel through the water-immiscible liquid; while the rate of movement of the globules depends upon the relative density and viscosity of the fluid medium employed. If the latter medium has a low viscosity and a density far removed from that of the colloidal solution, the globules of the latter solution will travel rapidly, hence the gel pellets will assume flat or disc-like shapes. Examples of liquids in which pellets of this type may be produced are benzene, carbon tetrachloride, or petroleum naphtha. A water-immiscible fluid medium having a high viscosity or a density close to that of the colloidal solution will effect slow movement of the globules of the latter solution and thus form spherically-shaped gel pellets. It is apparent from the above description that gel pellets of any shape, varying from flat-like discs to perfect spheres, may be manufactured by choice of a water-immiscible fluid medium having the proper density and viscosity.

The success of this process is due to the fact that the gelation time for a large number of materials can be controlled very accurately.

I have studied the preparation of many gels in which silica is the predominant component and found that the gelation time can be controlled so that the invention described above may be utilized in their preparation. The following is a list of the gels I have prepared by the methods described herein: silica gel, silica-alumina, silica-stannic oxide, silica-ceria, silica-thoria, silica-zirconia, silica-alumina-thoria, silica-alumina-zirconia, silica-alumina-stannic oxide, silica-alumina-ceria. Further, the methods described herein may be extended to the preparation of many other types of gels.

The time of gelation is dependent upon temperature, pH and concentrations of reactants. The higher the temperature, the shorter the time of gelation. At fixed concentrations of reactants the gelation time increases with decrease in pH provided the pH is within the limits of the invention. When the temperature and pH are constant, the gelation time decreases as the reactant solutions are made more concentrated. Considerations controlling gelation time are discussed in detail in my copending application Serial No. 461,455, filed October 9, 1942.

Briefly, the present invention contemplates a catalyst pellet of generally rounded outline having uniform porosity, a hard surface and unusually high crushing strength. These pellets are better suited to stationary bed operation than conventional molded catalyst pellets because of their high resistance to breakdown in transportation and use; but their advantages are achieved to a very high degree when used in continuous processes involving constant exposure to forces tending to abrade and crush the pellets.

With respect to the characteristics discussed above, my present invention is similar to the processes of my prior applications. It differs, however, in that according to the present invention a sol is prepared which has a relatively long gelation time as compared with that of sols promptly extruded into the immiscible fluid medium for gelation. As noted above, increase of temperature results in decrease of gelation time and I take advantage of that fact to use sols which normally require long gelation periods. In many types of operation this results in real advantages. When using the principles of this invention it is possible to make up the sol in batches at about room temperature and use the sol over a period of time with suitable preheating. It is also feasible to prepare cheaply a specific desired hydrogel which, because of the pH and concentration desired, requires a long gelling time and hence an impractically deep column of oil for gelation. By heating the sol between mixing and extrusion or by heating in a hot oil column or both, a relatively shallow oil column may be employed.

It is a preferred feature of the present invention that hydrogel particles having reduced water content are produced by forming the sol at temperatures of about 35° to about 50° F. This materially decreases the load on drying equipment required to prepare the gel for use. For example, in preparing a silica-alumina gel having a molar silica-alumina ratio of 23 to 1, which is most efficient for hydrocarbon conversions, by mixing water glass with an acid solution of aluminum sulfate at room temperature, the upper limit of product concentration calculated as weight per cent of silica plus alumina in the hydrogel is about 7 per cent for short gelation times. Silica-alumina gel having a molar silica-alumina ratio of 32 to 1 prepared by mixing acid with an aqueous solution of water glass and sodium aluminate may reach a product concentration of about 14 per cent at room temperature, but not substantially more. However, if the sol is prepared at 40° F. by mixing aqueous solutions precooled to that temperature, product concentrations of 10 per cent and 17.5 per cent may be obtained without precipitation by use of aluminum sulfate and sodium aluminate, respectively.

Other objects and advantages of the invention will be apparent from the detailed discussion below of preferred embodiments of the invention when considered in connection with the accompanying drawings wherein:

Figure 1 is an illustration in vertical section of one type of apparatus for carrying out the invention;

Figure 2 is a diagrammatic showing of apparatus employing a preheater for sol prepared in batch fashion;

Figure 3 shows diagrammatically apparatus employing the principle of upward flow of sol globules;

Figure 4 is a fragmentary section through apparatus for extrusion of the sol by centrifugal force; and Figure 5 is a section showing a mixing nozzle for three solutions.

Referring specifically to Figure 1, a sol having a relatively long gelling time at the temperature of preparation is formed by intimate admixture in mixing nozzle 10 of two (or more) reactant solutions supplied in a predetermined proportion from metering pumps 11 and 12 by pipes 13 and 14. The reactant solutions may be cooled prior to mixing by any suitable means, such as heat exchangers 31 and 32. The said sol is promptly extruded into a column of oil in a vessel 15, the oil being maintained at an elevated temperature by circulation of a heat exchange medium such as steam through a coil 16 immersed in the oil. The oil raises the temperature of the globules of sol into which the stream issuing from nozzle 10 is broken and thus materially reduces the gelation time thereof. This method is very satisfactory for the preparation of small sized particles (80 mesh or smaller after the shrinkage which accompanies drying of the hydrogel as described below), by reason of the fact that a perforated screen over the orifice of the nozzle may be employed to provide a plurality of very small streams. As the sol globules fall through the column of oil, they set to firm elastic gel spheroids, the gelling time being accelerated by the increase in temperature. The spheroidal gel particles pass from the oil column through an interface 17 into a layer of water at the bottom of the vessel 15 from which they are removed in a current of water admitted by pipe 18 and withdrawn by pipe 19 through a gooseneck having a vent 20 to maintain the interface 17 at the desired level.

The capability of such apparatus to form very small spheroids is particularly advantageous in the preparation of catalyst for catalytic cracking of hydrocarbon oils in processes where the catalyst is suspended in the hydrocarbon vapors to be cracked and subsequently suspended in an oxygen containing gas for regeneration by burning of carbonaceous deposits accumulated in the cracking step. If the sol is made up of such concentration, pH etc. that it will set at the temperature of formation in falling through an oil column of practicable height, say 10 to 20 feet, extrusion through perforated plate over the nozzle orifice normally results in large quantities of gel being formed within the nozzle, clogging the perforations and impairing mixing efficiency. According to the present invention, the gelation time at the temperature of formation is sufficiently long that the sol has great fluidity throughout the time it remains in the nozzle.

The sol may be prepared in batch fashion and heated just prior to extrusion into the oil column. Suitable apparatus for such operation is shown in Figure 2. A sol of such concentration, pH, etc., as to have a very long gelling time at the temperature of formation and storage, is contained in a storage vessel 21 from which it is passed through a heat exchanger 22 and thence to a nozzle 23 for extrusion into a body of oil in vessel 15. It must be remembered that gelation is a function of both time and temperature and that sol stored in vessel 21 ages during the storage period. It follows that the last portion of sol withdrawn will be nearer gelation than the first portion as it enters heater 22. If the period of withdrawal from storage vessel 21 is a substantial proportion of the time of gelation at the temperature of the storage vessel, this factor must be taken into account in determining the temperature to which the sol shall be heated in heater 22. For example, assume a sol having a gelation time of 3 hours at the temperature of storage is withdrawn over a period of one hour. At the time it is withdrawn the last portion to be withdrawn will gel in two hours at the temperature of storage and should be heated to a lesser temperature in heater 22 than the first portion withdrawn.

By using as the immiscible liquid a composition having a higher specific gravity than the sol, globules may be prepared according to the present invention with upward movement of the sol through the liquid. Suitable apparatus for that type of process is shown in Figure 3. Sol having a predetermined suitable gelling time is introduced by pipe 24 to nozzle 25, for example, from a storage vessel and heater as in Figure 2. Due to its lower specific gravity with respect to the immiscible liquid in vessel 15, the sol moves upwardly to a layer of water above interface 26, from which it is withdrawn in a stream of water induced to move by flow in pipes 27 and 27'. If desired, features of Figure 1 may be incorporated by substituting mixing nozzle 10 for pipe 24 and installing a heat exchange coil in vessel 15.

It will be recognized that, even when the sol is preheated before extrusion into the oil, it is often desirable that the oil shall be at a higher temperature than the sol extruded. This permits extrusion of a sol which has a high safety factor with respect to possibility of gelation in the extrusion apparatus. Thus, in each of Figures 2 and 3 it is preferred that the oil be heated by use of a coil, external circulation through a heat exchanger, or other suitable means for the purpose.

In the preparation of small pellets of gel, it is often desirable that high extrusion pressures be employed. This result may be accomplished by pressure applied on the liquid supplied to the extrusion device. Another suitable expedient for pressure extrusion employs centrifugal force as in Figure 4. A basket 28 having a number of perforations in its vertical walls is partially immersed in the liquid in vessel 15 and mounted for rotation about its axis, as by shaft 29 rotated from a source of power not shown. Sol is introduced by pipe 30 from a mixing nozzle or storage facility. Due to rotation of basket 28, sol introduced thereto is extruded under the pressure of centrifugal force through the perforations in the basket and is sheared off by the liquid in which the basket revolves. This shearing action permits somewhat closer control of particle size than can be readily achieved with apparatus of the other types described. High fluidity of the sol as extruded is very desirable and the sol is preferably supplied at such conditions of temperature, pH, concentration, etc., as to have a rather long gelling time. The bath of immiscible liquid is at high temperature whereby the sol particles are caused to gel in a time which permits the use of a liquid column of practicable depth.

A further modification of the invention is typified by a combination of Figures 1 and 2 employing a mixing nozzle in place of the storage vessel 21. According to this type, sol is continuously prepared and promptly passed through heater 22 to be extruded into the liquid column in vessel 15, the liquid preferably being at a temperature above that of the sol as extruded.

The nozzle of Figure 5 is adapted to mix three metered solutions together to form the sol. Water glass and sodium aluminate are supplied by pipes 35 and 36, respectively, to the upper part of a vertical chamber 37 at sufficiently rapid rates to induce turbulent mixing. Acid is supplied to a lower point by pipe 38, thus forming the desired sol.

Example I

A water glass solution was prepared by diluting 27.40 pounds of "N" brand of sodium silicate with 17.68 pounds of water. This solution contained 212 grams of $SiO_2$ per liter and 66 grams of $Na_2O$ per liter. A second solution was prepared by dissolving 387 grams of sodium aluminate in water to form ten liters of solution. These two solutions were mixed in batch form with efficient stirring in the ratio of 100 volumes of the former to 67.8 volumes of the latter.

The sodium-aluminate sodium-silicate solution, immediately after preparation, was mixed in the nozzle mixer with a 1.224 normal hydrochloric acid in equal volumes to form a colloidal solution having a pH of 5.7 and a gelation time of three minutes at room temperature. The colloidal solution was extruded from the nozzle mixer into the top of a column of gas oil whose depth was twelve feet and which was maintained at a temperature of 95° C. The sol globules fell through the oil and gelled before passing into the layer of water located beneath the oil.

The gel in the globular form was conducted out of the bottom of the column in a stream of water and on removal from the water, it was washed with petroleum naphtha to remove oil from its surface. It was then washed with water and $NH_4Cl$ solution, to replace zeolitically held sodium ions by ammonium ions which are capable of being driven off as $NH_3$ gas by heat. The gel was dried slowly and uniformly at 180° F. until shrinkage was substantially complete and the drying was continued at a gradually-increasing temperature up to 1050° F. at which temperature it was maintained for two hours. The silica-alumina gel retained its spheroidal shape during the washing and drying operations. Alternatively, the hydrogel pellets may be dried without shrinkage by replacing the original liquid phase, water, by a liquid of relatively low critical temperature, such as alcohol, heating to the critical temperature while maintaining pressure sufficient to maintain the alcohol liquid and permitting vaporization of the alcohol at a temperature above the critical.

Example I illustrates the preferred method of preparing pellets having diameters of less than 0.1 millimeter; however, pellets of any desired size may be prepared by this method. Colloidal solutions, prepared by the methods of this invention, having gelation times at room temperature of more than several minutes and as long as several hours, may be converted into spheroidal pellets by preheating the sol for a predetermined length of time and then introducing it in the form of globules into a body of oil at an elevated temperature, wherein the sol globules gel. This process is illustrated in the following example.

Example II

The sodium-aluminate sodium silicate solution prepared as described in Example I was mixed in the nozzle mixer with a 3.780 normal hydrochloric acid solution in the ratio of 100 volumes of the former solution to 32.6 volumes of the acid solution to form a sol having a pH of 3.4 and a gelation time of two hours at room temperature. The colloidal solution leaving the mixing chamber was pumped through a preheater which consisted of a pipe twisted into a coil and immersed in a bath maintained at 70° C. The sol remained in the preheater for 120 seconds before being introduced, in the form of globules, at the top of a column of gas oil which was twelve feet deep and was maintained at a temperature of 95° C. The globules of the colloidal solution fell through the oil and gelled before passing into the layer of water located beneath the oil. The hydrogel pellets were washed and dried as described in Example I.

In Examples III and IV are described the preparation of hydrogel beads by mixing solutions of sodium silicate, sodium aluminate and sulfuric acid in the mixing nozzle shown in Figure 5.

Example III

Concentrations of solutions:

Sodium silicate _____ 0.218 gram $SiO_2$/cc.—prepared by diluting "N" brand
Sodium aluminate ____ 0.0236 gram $Al_2O_3$/cc.
Sulfuric acid _____ 8.20 normal Solutions were mixed at 75° F. in the ratio of 195.0 cc. of sodium silicate to 96.0 cc. of sodium aluminate to 53.0 cc. of sulfuric acid. pH of sol= 5.4, gelation time 20 seconds, P. C.=13.

Example IV

Concentrations of solutions:

Sodium silicate _____ 0.240 g. $SiO_2$/cc.—prepared by diluting "N" brand
Sodium aluminate ___ 0.040 g. $Al_2O_3$/cc.
Sulfuric acid _____ 19.8 normal Solutions were mixed at 38° F. in the ratio of 177 cc. of sodium silicate to 56.5 cc. of sodium aluminate to 22.0 cc. of sulfuric acid. pH of sol= 5.3, gelation time 20 seconds, P. C.=17.5.

The hydrogel beads of Examples I and II were maintained in water at 135° F. for eight hours to reduce the apparent density of the dry product, The heat-treated beads were then washed, base exchanged and dried in usual manner. Both of these catalysts had an activity of 47% conversion of Oklahoma City gas oil to 410° F. endpoint gasoline.

EXAMPLE V

An acid solution was prepared by dissolving aluminum sulfate in dilute hydrochloric acid to form a solution containing 24.70 grams of HCl and 13.66 grams of $Al_2O_3$ per liter of solution.

A sodium silicate solution was prepared by diluting "N" brand sodium silicate with water to a $SiO_2$ content of 105 grams per liter.

These two solutions were mixed at 70° F. in the mixing nozzle in the ratio of 100 cc. of sodium silicate to 58.0 cc. of acid solution to form a sol having a pH of 6.6 and a gelation time of 10 seconds. The product concentration was 7.15.

EXAMPLE VI

An acid solution was prepared by dissolving aluminum sulfate in hydrochloric acid to form a solution containing 57.30 grams HCl and 31.35 grams $Al_2O_3$ per liter of solution. This solution was mixed at 40° F. in the mixing nozzle with the sodium-silicate solution described in Example V (105 g. $SiO_2$/liter) in the ratio of 25.0 volume of the former to 100 volumes of the latter to form a sol having a pH of 6.6 and a gelation time of 10 seconds, when extruded into oil at room temperature. The product concentration was 9.0.

The hydrogel beads of Examples V and VI were washed, base exchanged and dried in the usual manner. They each had an activity of 50% under standard cracking conditions.

The spherical pellets of Example I have been compared by hardness tests to pellets formed in conventional manner. A comparison on cracking efficiency shows the present pellets to produce substantially the same amount of gasoline as molded pellets and broken fragments. A silica-alumina hydrogel was prepared by mixing reagents of the same concentration and in the same proportions as in Example I. This was permitted to gel as a mass in conventional manner.

The hydrogel, after being washed, was divided into two portions, the one part was dried, then crushed to produce fragmentary pieces of the desired size; the other portion of the hydrogel was cast into molds and dried, thus forming small cylindrical pellets. These two forms of gel were subjected to a hardness test developed for cracking catalysts which consists of tumbling an 80 cc. sample of material in a one-pound grease can with one ⅜" x 3¼" Monel metal rod at 80 R. P. M. on a paint roller mill for a period of one hour, then screening the sample to determine the quantity which was powdered and broken down to a size smaller than the original. The fragmentary pieces of gel showed a breakdown of 12%, while the cylindrical pellets were broken down to the extent of 6%. The larger breakdown with the gel in the fragmentary form is probably due to the irregular shapes and to the stresses and fissures developed during the crushing operation.

The spherically-shaped gel in Example I under the above conditions of hardness test gave no powdering nor breakdown. Continuing the test for an additional 15 hours merely scratched the surface of the spheres, thus producing only a negligible amount of fines. Subjecting the gel to the hardness test for a total of eighty hours gave 0.3% of material which was smaller in size than the original. The pellets of this invention generally show losses under this test of less than 1% per hour, while the preferred pellets show losses less than 0.25% per hour.

The pellets of this invention may act as carriers for other material in the manner well known in the art.

The gel pellets of the present invention vary in size according to the degree of subdivision of the colloidal solution which is, in turn, a function of several variables, the most important being manner of supplying the colloidal solution and surface tension at the interface between colloidal solution and the immiscible liquid to which it is supplied. Size of the pellets will also be affected by the manner of drying; it appears that shrinkage during drying is due to capillary action at the meniscus of the liquid phase as it retreats through the porous gel structure. Pellets as large as desired can be prepared; but for the most purposes, particularly for catalytic hydrocarbon conversion, maximum sizes are about 10 millimeters in diameter.

Small particles are also obtained by crushing the pellets to any desired size. The present gels are found to retain their high hardnesses after such crushing and their high densities are also retained. Some changes in apparent density is found due to difference in packing of the different types of particles. Under conditions of commercial operation, there is a substantial proportion of product which is rejected, either because of size or because of cracking of the pellets. These rejects furnish a good source of hard gel for crushing.

The pellets are generally spheroidal in shape, usually being somewhat flattened to forms approximating ellipsoids. The irregularity of the shapes and sizes under methods of commercial production are strongly reminiscent of the rounded pebbles in the bed of a water course; though the pellets are, of course, much smaller. For that reason, the best definition of shape seems to be "rounded pellets" designating solids which are bounded substantially solely by smooth curves, and having substantially no plane or angular faces. The surfaces of the pellets, in addition to being made up of smooth curves, are usually inherently smooth themselves; being similar to a glass in smoothness and luster at surfaces resulting from formation as contrasted with fracture surfaces. The resemblance to glass is further intensified by the nature of the fracture and the power to transmit visible light. The fracture is characteristically conchoidal and the pellets are transparent to translucent, depending upon the mode of formation, i. e., concentration and pH of colloidal solution, history of treatment, etc. This is in marked contrast to the molded synthetic gel pellets which are essentially chalky in appearance and physical characteristics, although a little harder than chalk.

The surfaces (both original and fracture surfaces) of the present pellets are extremely hard in view of the chemical and physical nature thereof. Precipitated silica is normally soft. The highly porous nature of the spheroidal pellets leads to an expectation that the pellets would have easily scratched surfaces. Surprisingly, the surfaces have hardnesses on the order of that of glasses. The preferred types vary in hardness from slightly less than 4 on Mohs' scale to 6 and harder. Pellets are readily obtained on a commercial scale capable of scratching annealed glass such as "Pyrex." The advantages of such hardness are obvious, particularly when coupled, as in the present case with a smooth surface.

When used for catalytic conversion of hydrocarbons, for example, particles of catalytic material are either packed in a stationary bed, passed continuously as a moving column through a treating chamber or suspended in the gaseous material to be contacted. In the continuous processes, the particles are in constant motion and subjected to constant abrasion. Smooth, hard surfaces, such as those of the present pellets, resist abrasion, while the soft rough surfaces of the particles used by the prior art break down rapidly producing undesired fines and using up the catalyst. Even in stationary bed operation, the pellets are subjected to destructive forces. The pellets must be transported to and placed in the apparatus and during operation, flowing gases and fluctuating pressures result in the motion of portions of the contact bed and by these means produce undesirable attrition.

The strength of the pellets is extremely high. Individual particles, prepared in the manner described above, support well over 50 pounds. This is determined by placing a single pellet on an anvil and applying force directly to the upper surface of the pellet until it crushes. Individual pellet strengths in excess of 100 pounds are preferred and strengths of 350 pounds are not unusual in normal pellets prepared as described. A contrast with molded pellets of the same chemical composition is helpful. As prepared commercially, these molded pellets crush under a weight of about 5 pounds. By molding under high pressure it is possible to achieve a strength of about 20 pounds maximum, but pressure molding is not commercially feasible. The crushing strength of the pellets in mass is also extremely high. Normal pellets of this invention will withstand (in mass) pressures upwards of 1000 pounds per square inch and it is preferred that the mass of pellets be capable of withstanding at least 2000 pounds per square inch. Batches have been prepared of pellets which, in mass, withstand pressure of 3000 pounds per square inch or more. For purpose of comparison, it is noted that commercial molded silica gel catalyst in mass crushes under pressures of 500 pounds per square inch, while fragmentary particles of silica gel catalyst in mass crush under pressures of 100 pounds per square inch.

Internally, the present gel pellets have substantially the structure of the original hydrogel with the liquid phase removed. The size of the pellet is, of course, reduced in normal drying and the structure is probably slightly deformed to a degree commensurate with deformation of the pellet as a whole. For all practical intents and purposes, however, the original gel structure is completely retained by the dried pellets. It is a necessary corollary of this fact that the finished gel pellets are uniformly porous are contrasted with molded pellets wherein some portions are badly deformed by the molding operation to largely eliminate a portion of the porous structure.

The apparent density of the product varies in the same direction as the crushing strength, but the strength is not simply a function of apparent density. By the term "apparent density," reference is made to weight, as compared with the volume occupied by a mass of the particles. It is determined by weighing a fairly large volume of particles. For example, a large diameter graduated cylinder is filled to a volume calibration and the weight of pellets determined by difference in weight of the graduate before and after filling with pellets. In general, apparent density of the present pellets varies between 0.5 and 1.1 grams per cc. Lighter pellets having apparent densities as low as 0.3 gram per cc. can be prepared but their hardness and crushing strength are low. Apparent densities above 0.7 gram per cc. are preferred. By comparison, molded gel catalyst usually has an apparent density around 0.55 gram per cc. Higher densities, up to about 0.75 gram per cc. are possible with high pressure molding. An interesting independence of apparent density and composition of the gel pellets has been noted. When silica-alumina gels are prepared by mixing sodium aluminate, water glass and sulfuric acid, increased apparent densities permit lowering of the alumina content for equal activities. Strangely, this rule does not apply if the colloidal solution to be gelled is obtained by mixing sodium aluminate, water glass and hydrochloric acid to obtain a colloidal solution of the same pH, silica content and alumina content. The table below shows the strange relationship noted above. The table shows activities of a number of $Al_2O_3$-$SiO_2$ gel catalyst pellets prepared by mixing sodium aluminate, water glass and sulfuric acid.

Table

| Catalyst Composition | | Apparent Density of Catalyst | Activity |
|---|---|---|---|
| $Al_2O_3$ | $SiO_2$ | | |
| 3.0 | 97 | 0.440 | 25 |
| 5.0 | 95 | 0.465 | 35 |
| 10.0 | 90 | 0.695 | 50 |
| 2.0 | 98.0 | 0.802 | 50 |
| 2.5 | 97.5 | 0.780 | 48 |
| 2.5 | 97.5 | 0.897 | 48 |
| 3.0 | 97.0 | 0.838 | 47 |

The "activity" of the catalyst is a measure of its capacity to catalyze conversion of hydrocarbons and is expressed here as the percentage conversion of Oklahoma City Gas Oil having an A. P. I. gravity of 35.8 and a boiling range of 471° to to 708° F. to gasoline having an endpoint of 410° F. by passing vapors of the said gas oil through the catalyst at 800° F., substantially atmospheric pressure and a feed rate of 1.5 volumes of liquid oil per volume of catalyst per hour.

The activity is a relative property which can be defined accurately only with respect to a specific conversion at specified conditions. Thus, on the basis of the defined test, suitable catalysts in general will have activities of not less than about 5 per cent. Obviously, a 5-per cent conversion to gasoline is not a good commercial process, but the test is not intended to indicate maximum or minimum activity, but rather to afford a basis for comparison of catalysts. It would be extremely difficult to evaluate activity on any other basis, since conversion varies with nature of the charging stock and conditions of treatment. In general, conversion of gas oil to gasoline increases with increased temperature or pressure. A "low-activity" catalyst usually gives reasonably good yields at more drastic conditions. A typical catalyst of low activity on the basis of the present test is a silica-alumina catalyst having an activity of 5 per cent in the above arbitrary test. But at 900° to 950° F., conversion to gasoline on the order of 30 percent may be achieved with the same charging stock, pressure and rate.

Hydrocarbon conversion catalysts should have activities of about 5 per cent or better in the above test, while for general purposes (i. e., use over the whole range of conversion conditions) catalysts of at least 20 per cent activity are desirable. It is preferred that the catalyst have an activity of not less than 40 per cent.

Density of the catalyst is an important property in itself for many uses. In any type of catalytic conversion of hydrocarbons, some of the solid catalyst is carried by the converted vapors. When using the preferred pellet catalyst of this invention as a bed, either stationary or moving, the amount of fines so carried is extremely small and may often be permitted to pass with the vapors for collection with residual tarry material after separation of lighter, more valuable hydrocarbons. However, if it is desired to separate fines so carried, or in processes where the catalyst is suspended in the vapors, separation is a major problem. The high densities of the preferred catalysts of this invention permit of ready separation of finely-divided material. These preferred catalysts have apparent densities in excess of about 0.7 gram per milliliter.

Another effect of density is in controlling temperatures of the catalyst mass in use. In regenerating spent hydrocarbon conversion catalysts, carbonaceous and/or hydrocarbonaceous deposits are burned off with preheated air. Provision must be made for some means to abstract heat from this highly exothermic reaction to prevent damage to the catalyst. The more dense catalysts have a higher heat capacity per unit volume and are thus able to absorb more heat themselves without suffering heat damage, thus decreasing the load on other heat-controlling means in the system.

As noted above, the present pellets are very well suited to bed-in-place operations of the type described in the patents to Eugene J. Houdry and associates. Much greater advantages are realized, however, in continuous operation in apparatus for passing the catalyst cyclically through conversion and regeneration zones.

I claim:

1. A process for forming spheroidal hydrogel globules containing water-insoluble inorganic oxides and substantially free of precipitate which comprises cooling two aqueous solutions capable of forming a gelable sol to temperatures between about 35° F. and about 50° F., mixing said solutions while maintaining the temperature thereof in said range, injecting the so-formed sol into a body of a water-immiscible liquid maintained at a temperature substantially above 50° F. but below the boiling point of said sol, whereby said sol is caused to separate into a plurality of globules and is heated to decrease the gelation time thereof, and retaining said globules in said liquid until they set to firm hydrogel.

2. A process for forming spheroidal hydrogel globules containing water insoluble inorganic oxides which comprises cooling an aqueous water glass solution and an aqueous acid solution to temperatures between about 35° F. and about 50° F., said solutions being capable of forming a gelable sol within said temperature range, mixing said solutions while maintaining the temperature thereof in said range, injecting the so-formed sol into a body of a water-immiscible liquid maintained at a temperature substantially above 50° F., but below the boiling point of said sol, whereby said sol is caused to separate into a plurality of globules and is heated to decrease the gelation time thereof, and retaining said globules in said liquid until they set to firm hydrogel.

3. A process for forming spheroidal hydrogel globules containing water-insoluble inorganic oxides which comprises cooling an aqueous water glass solution and an aqueous acid to temperatures between about 35° F. and about 50° F., at least one of said solutions containing a water-soluble aluminum compound and said solutions being capable of forming a gelable sol within said temperature range, mixing said solutions while maintaining the temperature thereof in said range, injecting the so-formed sol into a body of a water-immiscible liquid maintained at a temperature substantially above 50° F. but below the boiling point of said sol, whereby said sol is caused to separate into a plurality of globules and is heated to decrease the gelation time thereof, and retaining said globules in said liquid until they set to firm hydrogel.

4. A process of forming inorganic oxide gel particles of generally spheroidal shape which comprises extruding an aqueous sol capable of setting to a hydrogel having a solid phase of inorganic oxides into a body of a liquid immiscible with said sol and maintained at a temperature higher than the temperature of said sol but below the boiling point of said sol, whereby globules of sol are formed in said liquid and are heated by said liquid to reduce the gelatin time thereof, and causing said globules to remain in said liquid until gelation occurs.

5. A process of forming inorganic oxide gel particles of generally spheroidal shape which comprises extruding an aqueous sol capable of setting to a hydrogel having a solid phase containing silica as a major constituent into a body of a liquid immiscible with said sol and maintained at a temperature higher than the temperature of said sol but below the boiling point of said sol, whereby globules of sol are formed in said liquid and are heated by said liquid to reduce the gelation time thereof, and causing said globules to remain in said liquid until gelation occurs.

6. A process of forming inorganic oxide gel particles of generally spheroidal shape which comprises extruding an aqueous sol capable of setting to a hydrogel having a solid phase of inorganic oxide into a body of a liquid immiscible with said sol and maintained at a temperature higher than the temperature of said sol but below the boiling point of said sol, whereby globules of sol are formed in said liquid and are heated by said liquid to reduce the gelation time thereof, causing said globules to remain in said liquid until gelation occurs, removing the gelled globules from said liquid, washing said globules to remove soluble inorganic salts and drying the globules while retaining their spheroidal shape.

7. A process of forming inorganic oxide gel particles of generally spheroidal shape which comprises extruding an aqueous sol capable of setting to a hydrogel having a solid phase containing silica as a major constituent into a body of a liquid immiscible with said sol and maintained at a temperature higher than the temperature of said sol but below the boiling point of said sol, whereby globules of sol are formed in said liquid and are heated by said liquid to reduce the gelation time thereof, causing said globules to remain in said liquid until gelation occurs, removing the gelled globules from said liquid, washing said globules to remove soluble inorganic salts and drying the globules while retaining their spheroidal shape.

8. A process of forming inorganic oxide gel particles of generally spheroidal shape which comprises extruding an aqueous sol capable of setting to a hydrogel having a solid phase of inorganic oxide containing silica as a major constituent into a body of a hydrocarbon oil maintained at a temperature higher than the temperature of said sol but below the boiling point of said sol, whereby globules of sol are formed in said oil and are heated by said liquid to reduce the gelation time thereof, and causing said globules to remain in said oil until gelation occurs.

9. A process of forming inorganic oxide gel particles of generally spheroidal shape which comprises forming an aqueous sol capable of setting to a hydrogel of inorganic oxides, heating said sol to reduce the gelation time thereof, extruding the heated sol into a body of a liquid immiscible with water and maintained at a temperature higher than the temperature of said sol but below the boiling point of said sol, whereby globules of sol are formed in said liquid and are heated by said liquid to further reduce the gelation time thereof, and causing said globules to remain in said liquid until gelation occurs.

10. A process of forming inorganic oxide gel particles of generally spheroidal shape which comprises forming an aqueous sol capable of setting to a hydrogel containing silica as a major constituent, heating said sol to reduce the gelation time thereof, extruding the heated sol into a body of a liquid immiscible with water and maintained at a temperature higher than the temperature of said sol but below the boiling point of said sol, whereby globules of sol are formed in said liquid and are heated by said liquid to further reduce the gelation time thereof, and causing said globules to remain in said liquid until gelation occurs.

11. A process of forming inorganic oxide gel particles of generally spheroidal shape which comprises forming an aqueous sol capable of setting to a hydrogel of inorganic oxide, heating said sol to reduce the gelation time thereof, extruding the heated sol into a body of a liquid immiscible with water and maintained at a temperature higher than the temperature of said sol but below the boiling point of said sol, whereby globules of sol are formed in said liquid, are heated by said liquid to further reduce the gelation time thereof, and causing said globules to remain in said liquid until gelation occurs, removing the gelled globules from said liquid, washing said globules to remove soluble inorganic salts and drying the globules while retaining their spheroidal shape.

12. A process of forming inorganic oxide gel particles of generally spheroidal shape which comprises forming an aqueous sol capable of setting to a hydrogel containing silica as a major constituent, heating said sol to reduce the gelation time thereof, extruding the heated sol into a body of a liquid immiscible with water and maintained at a temperature higher than the temperature of said sol but below the boiling point of said sol, whereby globules of sol are formed in said liquid and are heated by said liquid to further reduce the gelation time thereof, causing said globules to remain in said liquid until gelation occurs, removing the gelled globules from said liquid, washing said globules to remove soluble inorganic salts and drying the globules while retaining their spheroidal shape.

13. A process of forming inorganic oxide gel particles of generally spheroidal shape which comprises forming an aqueous sol capable of setting to a hydrogel having a solid phase of inorganic oxides containing silica as a major constituent, heating said sol to reduce the gelation time thereof, extruding the heated sol into a body of a hydrocarbon oil maintained at a temperature higher than the temperature of said sol but below the boiling point of said sol, whereby globules of sol are formed in said oil and are heated by said liquid to reduce the gelation time thereof, and causing said globules to remain in said oil until gelation occurs.

MILTON M. MARISIC.

REFERENCES CITED

The following references are of record in the file of this patent:

UNITED STATES PATENTS

| Number | Name | Date |
| --- | --- | --- |
| 1,748,315 | Stoewener | Feb. 25, 1930 |
| 1,900,859 | Connolly et al. | Mar. 7, 1933 |

Certificate of Correction

Patent No. 2,418,232.

April 1, 1947.

MILTON M. MARISIC

It is hereby certified that errors appear in the printed specification of the above numbered patent requiring correction as follows: Column 1, line 23, for "gelatin" read *gelation*; line 24, for "hydrogen" read *hydrogel*; column 2, line 11, for "progressive" read *progressively*; column 11, line 60, for "are" read *as*; column 14, line 30, claim 4, for "gelatin" read *gelation*; and that the said Letters Patent should be read with these corrections therein that the same may conform to the record of the case in the Patent Office.

Signed and sealed this 12th day of August, A. D. 1947.

[SEAL]

LESLIE FRAZER,
*First Assistant Commissioner of Patents.* inorganic salts and drying the globules while retaining their spheroidal shape.

8. A process of forming inorganic oxide gel particles of generally spheroidal shape which comprises extruding an aqueous sol capable of setting to a hydrogel having a solid phase of inorganic oxide containing silica as a major constituent into a body of a hydrocarbon oil maintained at a temperature higher than the temperature of said sol but below the boiling point of said sol, whereby globules of sol are formed in said oil and are heated by said liquid to reduce the gelation time thereof, and causing said globules to remain in said oil until gelation occurs.

9. A process of forming inorganic oxide gel particles of generally spheroidal shape which comprises forming an aqueous sol capable of setting to a hydrogel of inorganic oxides, heating said sol to reduce the gelation time thereof, extruding the heated sol into a body of a liquid immiscible with water and maintained at a temperature higher than the temperature of said sol but below the boiling point of said sol, whereby globules of sol are formed in said liquid and are heated by said liquid to further reduce the gelation time thereof, and causing said globules to remain in said liquid until gelation occurs.

10. A process of forming inorganic oxide gel particles of generally spheroidal shape which comprises forming an aqueous sol capable of setting to a hydrogel containing silica as a major constituent, heating said sol to reduce the gelation time thereof, extruding the heated sol into a body of a liquid immiscible with water and maintained at a temperature higher than the temperature of said sol but below the boiling point of said sol, whereby globules of sol are formed in said liquid and are heated by said liquid to further reduce the gelation time thereof, and causing said globules to remain in said liquid until gelation occurs.

11. A process of forming inorganic oxide gel particles of generally spheroidal shape which comprises forming an aqueous sol capable of setting to a hydrogel of inorganic oxide, heating said sol to reduce the gelation time thereof, extruding the heated sol into a body of a liquid immiscible with water and maintained at a temperature higher than the temperature of said sol but below the boiling point of said sol, whereby globules of sol are formed in said liquid, are heated by said liquid to further reduce the gelation time thereof, and causing said globules to remain in said liquid until gelation occurs, removing the gelled globules from said liquid, washing said globules to remove soluble inorganic salts and drying the globules while retaining their spheroidal shape.

12. A process of forming inorganic oxide gel particles of generally spheroidal shape which comprises forming an aqueous sol capable of setting to a hydrogel containing silica as a major constituent, heating said sol to reduce the gelation time thereof, extruding the heated sol into a body of a liquid immiscible with water and maintained at a temperature higher than the temperature of said sol but below the boiling point of said sol, whereby globules of sol are formed in said liquid and are heated by said liquid to further reduce the gelation time thereof, causing said globules to remain in said liquid until gelation occurs, removing the gelled globules from said liquid, washing said globules to remove soluble inorganic salts and drying the globules while retaining their spheroidal shape.

13. A process of forming inorganic oxide gel particles of generally spheroidal shape which comprises forming an aqueous sol capable of setting to a hydrogel having a solid phase of inorganic oxides containing silica as a major constituent, heating said sol to reduce the gelation time thereof, extruding the heated sol into a body of a hydrocarbon oil maintained at a temperature higher than the temperature of said sol but below the boiling point of said sol, whereby globules of sol are formed in said oil and are heated by said liquid to reduce the gelation time thereof, and causing said globules to remain in said oil until gelation occurs.

MILTON M. MARISIC.

REFERENCES CITED

The following references are of record in the file of this patent:

UNITED STATES PATENTS

| Number | Name | Date |
| --- | --- | --- |
| 1,748,315 | Stoewener | Feb. 25, 1930 |
| 1,900,859 | Connolly et al. | Mar. 7, 1933 |

Certificate of Correction

Patent No. 2,418,232.                                                                                                    April 1, 1947.

MILTON M. MARISIC

It is hereby certified that errors appear in the printed specification of the above numbered patent requiring correction as follows: Column 1, line 23, for "gelatin" read *gelation*; line 24, for "hydrogen" read *hydrogel*; column 2, line 11, for "progressive" read *progressively*; column 11, line 60, for "are" read *as*; column 14, line 30, claim 4, for "gelatin" read *gelation*; and that the said Letters Patent should be read with these corrections therein that the same may conform to the record of the case in the Patent Office.

Signed and sealed this 12th day of August, A. D. 1947.

[SEAL]

LESLIE FRAZER,
*First Assistant Commissioner of Patents.*